J. D. NIX.
Improvement in Hay and Cotton Presses.
No. 121,121. Patented Nov. 21, 1871.

Inventor
J. D. Nix
pr. Munn & Co.
Attorneys.

Witnesses.
E. Wolff.
Francis McArdle.

UNITED STATES PATENT OFFICE.

JOHN DAY NIX, OF NOBLE, ILLINOIS.

IMPROVEMENT IN COTTON AND HAY PRESSES.

Specification forming part of Letters Patent No. 121,121, dated November 21, 1871.

*To all whom it may concern:*

Be it known that I, JOHN DAY NIX, of Noble, in the county of Richland and State of Illinois, have invented a new and Improved Press; and I do hereby declare that the following is a full, clear, and exact description thereof, which will enable others skilled in the art to make and use the same, reference being had to the accompanying drawing forming part of this specification.

My invention relates to improvement in the class of hay and cotton presses in which a follower is worked in a horizontal frame or press-box by means of toggle-bars; and it consists in the arrangement of certain locking devices with the covers of the press-boxes, as hereinafter described.

Figure 1:
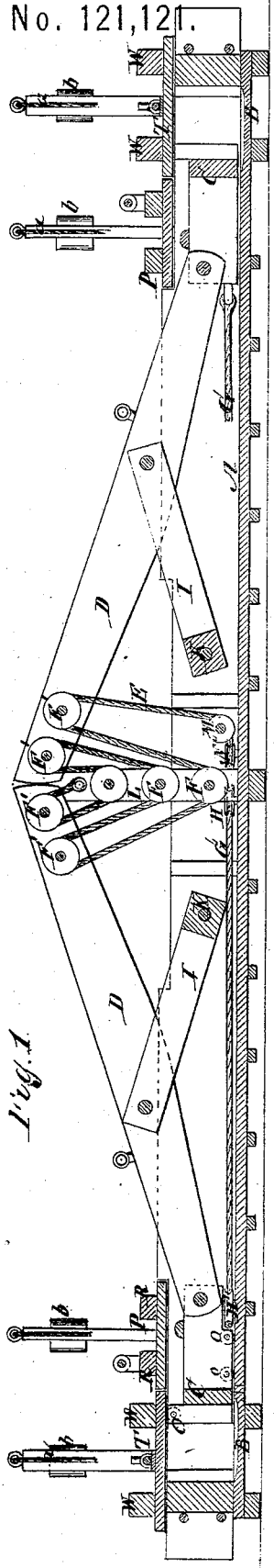
Figure 2:
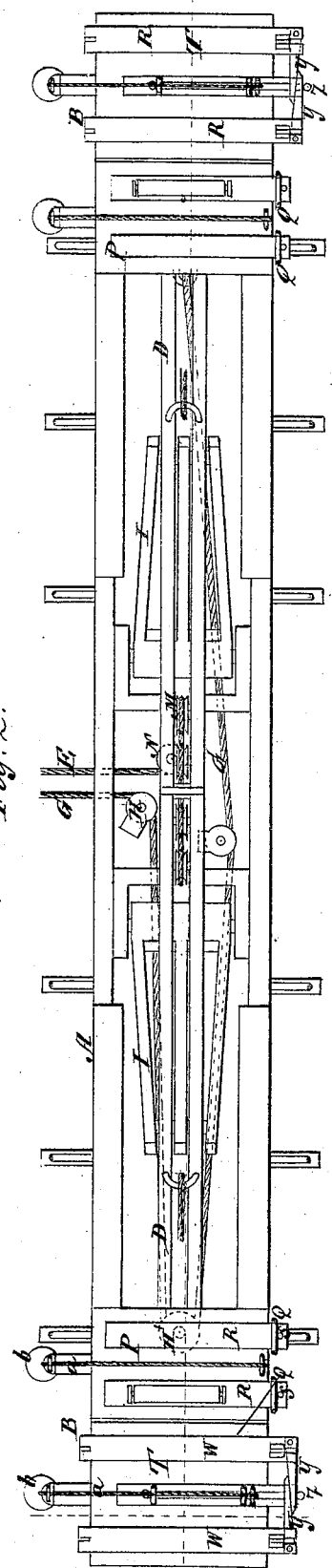
Figure 3:
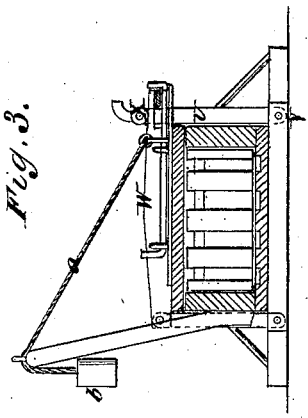
Figure 4:
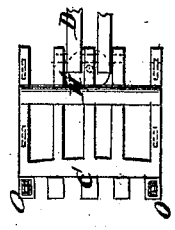

Figure 1 is a longitudinal sectional elevation of my improved press. Fig. 2 is a plan view. Fig. 3 is a cross-section; and Fig. 4 is a top view of one of the followers.

A is a long horizontal frame with a press-case, B, at each end. C represents the followers, one for each case, and D represents the bars connected with the followers for working them, the said bars being worked for forcing the followers into the cases by the rope E and pulley F and for drawing them out again by the rope G and pulleys H H'. The bars D are pivots to the short bars I, as shown, and the latter are pivoted to the frame at K. They are employed to control the long bars D in keeping the ends D' when rising and falling against each other. The rope for effecting the pressing passes over as many pulleys F on a standard, L, and F' on the bars as may be preferred, passing alternately from one to the other, and then over the guide-pulleys M and N. The rope G is attached to one follower and passes around pulley H' on the other; thence over guide-pulley H and out through the case, where rope E does, to be actuated in any approved way. The followers are provided with friction-rollers O, to run upon the sides of the case for lessening the friction. The doors P, which are used to open and close the part of the case in which the hay or cotton is first placed for filling, are fastened down by the links Q attached to the side of the case and arranged to swing up over the projecting ends of the cross-pieces R, the said links being prevented from escaping by pins S; but the doors T, which are over the part into which the ball is pressed, being subject to the pressure when they are to be opened, are provided with the catch-bars U hinged to the bottom of the frame at V, to swing into a slot in the ends of the cross-bar W, and they have friction-rollers X for bearing upon the upper surfaces of said bars, so that the latter may be disengaged easily, although subject to the pressure. For confining these catch-bars U upon the bars T the latches Y are employed, said latches being hinged in the ends of the bars T to swing around horizontally in front of the bars U, as indicated in Fig. 2, and they are confined by the turning-catch Z. Both the doors P and T are provided with cords and weights *a b* for raising them when released.

Having thus described my invention, I claim as new and desire to secure by Letters Patent—

1. The combination, with the catch-bars U and cross-bars W, of the friction-rollers X, substantially as specified.

2. The combination, with the catch-bars U and cross-bars W, of the catches Y and Z, substantially as specified.

JOHN DAY NIX.

Witnesses:
   A. G. KRETCHMER,
   FRANK MULLIN. (7)